United States Patent [19]

Lundgren

[11] Patent Number: 4,569,602
[45] Date of Patent: Feb. 11, 1986

[54] DEVICE COMPRISING AN ANGULAR CONTACT BEARING

[75] Inventor: Bengt Lundgren, Lerum, Sweden

[73] Assignee: SKF Nova AB, Gothenburg, Sweden

[21] Appl. No.: 649,985

[22] Filed: Sep. 13, 1984

[30] Foreign Application Priority Data

Oct. 10, 1983 [SE] Sweden ............................. 8302902

[51] Int. Cl.[4] .................. F16C 27/00; F16C 33/60
[52] U.S. Cl. ................................. 384/499; 384/504; 384/505; 384/517
[58] Field of Search ............ 384/490, 499, 500, 501, 384/502, 503, 504, 505, 506, 535, 517, 519, 536, 563

[56] References Cited

U.S. PATENT DOCUMENTS 1,286,505 12/1918 Beemer ............................ 384/504
3,801,171 4/1974 Rozentals ..................... 384/505 X
3,986,754 10/1976 Torrant ............................ 384/504

FOREIGN PATENT DOCUMENTS 293182 2/1932 Italy ................................. 384/489

Primary Examiner—Donald Watkins
Assistant Examiner—Thomas R. Hannon
Attorney, Agent, or Firm—Eugene E. Renz, Jr.

[57] ABSTRACT

In a device with a double-row angular contact bearing the outer raceways are arranged in elements (4,5) which are axially displaceable in relation to each other. Prestressing or play of the bearing is determined by an elastic ring (7) situated in a space delimited by opposing surfaces connected to the respective elements, whereby the axial bearing play decreases when the distance between the opposing surfaces increases.

4 Claims, 7 Drawing Figures

DEVICE COMPRISING AN ANGULAR CONTACT BEARING

BACKGROUND OF THE INVENTION

The invention concerns a device of the kind defined in the introduction of the claim.

Such devices are used e.g. in various kinds of wheels and rollers. Common angular contact bearings, especially such with two rows of rolling elements, are very stiff and capable of transmitting great tilting moments. Standard type bearings of this kind have an outer ring, an inner ring and two rows of balls and are comparatively expensive. In order to make assembly possible, they have a recess (ball filling groove) in the outer ring, which means that they can sustain great axial loads in one direction only. One advantage is that they are self-contained, which simplifies their handling.

In order to avoid the necessity of a filling groove in the outer ring and to make it possible to introduce a great number of balls, it is known to make the bearing with a split inner ring. Such a bearing is either not self-contained or provided with a sleeve or other connecting member for the inner rings. This last mentioned design comprises complicated and expensive measures and results in the preload or play of the bearing not being possible to predict with any precision, as does the use of two inner rings which contact each other directly.

SUMMARY OF THE INVENTION

The object of the present invention is to provide a device with a bearing according to the introductory clause, which bearing can be assembled and filled with a great number of rolling elements without being provided with filling openings, which can be given a desired preload in a simple manner during mounting, and which is very stiff after being mounted, so that it can take up heavy loads without being deformed appreciably. This is achieved by giving the device the characterizing features stated in the claims.

BRIEF DESCRIPTION OF THE DRAWINGS

The following is a detailed description of the invention with reference to the accompanying drawing, in which.

DESCRIPTION OF THE PREFERRED EMBODIMENTS

Figure 1:
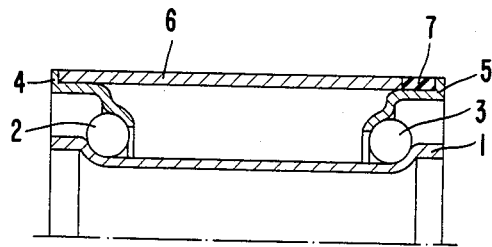
FIGS. 1-5 show longitudinal sections of bearing devices according to various embodiments of the invention and FIG. 6 shows an enlarged portion of a device.

The device according to FIG. 1 comprises an inner ring 1, two rows of balls, one ball 2, 3 in each row being shown, two outer rings 4, 5 with cylindrical envelope surfaces and radial flanges at their ends, an outer sleeve 6 whose inner diameter is equal to the diameter of the envelope surfaces of the outer rings and whose outer diameter is equal to the outer diameter of the flanges, and an elastically deformable member in the shape of the ring, e.g. an O-ring of rubber, with an inner diameter in an unloaded state of the ring smaller than the diameter of the envelope surface of the outer ring 5. Each of the outer rings 4, 5 have an outer raceway for the balls in each row of balls. The outer ring 4 is fixed to the outer sleeve 6, whereas the outer ring 5 is displaceable in the bore of the outer sleeve. Thus, the outer rings are displaceable in relation to each other parallel to the bearing axis so that adjustment of the bearing play or pre-stressing of the bearing is possible. The rubber ring 7 completely fills a space which is limited, in the axial direction of the bearing, by surfaces directed mainly perpendicular to the bearing axis, one of which is situated on the outer sleeve 6 which is fixed to the outer ring 4 and the other of which is situated on the outer ring 5. One surface is one of the end surfaces of the sleeve 6, and the other surface is the inner surface of the radial flange of the outer ring 5, and the surfaces are so arranged that the axial bearing play decreases when the distance between the surfaces increases. Thereby a light prestressing of the bearing is obtained if the rubber ring 7 is elastically compressed between said surfaces, so that the outer rings 4 and 5 are pressed away from each other by the spring force of the ring 7.

Figure 6:
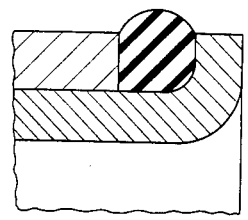

During assembly of the bearing, the outer ring 5 can be pushed into the sleeve 6 so that the rows of balls can be introduced without difficulty, due to the fact that the outer sleeve is shorter than the greatest distance between the flanges which exists when there is no play in the bearing. When the balls and any possible cage are mounted, the ring 5 is pushed outwards until all play is eliminated, whereby a space is formed between one of the side surfaces of the sleeve 6 and the inside of the flange of the ring 5. The resilient ring 7 is expanded and moved over the flange of the outer ring 5 and then released to enter the space. Because the inner diameter of the non-expanded ring 7 is smaller than the diameter of the bottom of the space, the ring will be so stressed that the space is completely filled by the resilient material. After assembly, the outer diameters of the flanges, the outer sleeve 6 and the ring 7 should preferably be equal, so that the device has a mainly continuous outer cylindrical surface. The device is thereby suitable for being inserted into a cylindrical bearing seat, e.g. a hub. The ring 7 may possibly be so big that some of its material protrudes radially outside of the sleeve 6 and the flanges when the ring is mounted, as shown in FIG. 6. The overflow material can thereby be cut off by e.g. a tool with a circular edge. If play is desired in the bearing, the rings 4, 5 may be pressed towards each other until the desired play is obtained, whereby the ring 7 expands outwards so that a greater amount of material can be cut off.

When the complete bearing unit is mounted in its seat, the ring 7 is completely enclosed in a closed space and cannot be compressed. Therefore, the bearing keeps the prestress which is brought about during assembly. In a test made on a bearing with 42 mm outer diameter, the bearing was loaded axially by a force of 10,000 N, whereby a relative displacement of the outer rings by less than 0.01 mm was measured when a resilient member in the shape of a normal O-ring was arranged to completely fill up a closed space.

Figure 2:
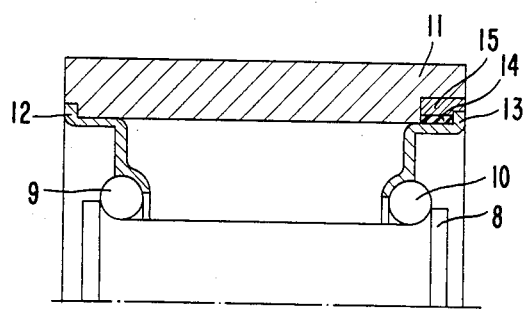

FIG. 2 shows an arrangement with a roller which has a ball bearing in its hub. In a manner corresponding to that shown in FIG. 1, there is one inner ring 8 and two rows of balls, one ball 9, 10 of each row being shown. A roller 11, e.g. a truck wheel, has a bore which contains two outer bearing rings 12, 13, one of which being displaceable axially in the bore of the roller and the other being fixed in the roller. A resilient ring 14 is arranged in a recess in the roller 11, which recess extends around a cylindrical portion of the outer ring 13. The ring 14 is situated between a side surface of the roller 11 and a flange on the bearing outer ring 13. A second ring 15, which can be a slotted steel ring or a closed plastics ring, is arranged outside of the ring 14 and fills the rest of the recess in the roller 11. The ring 15 can have a tapered portion which is squeezed against the elastic ring 14, and an abutment by which the ring can be snapped behind the flange of the bearing outer ring 13. When the bearing is assembled, the ring 13 is completely pushed into the recess of the roller 11, whereby the balls can be introduced between their respective raceways. Thereafter the ring 13 is moved outwards into contact with one of the rows of balls, whereafter the resilient ring 14 is placed in the recess in the roller 11. Then the ring 15 is pressed into the recess so that the recesss is completely filled.

Figures 3A, 3B:
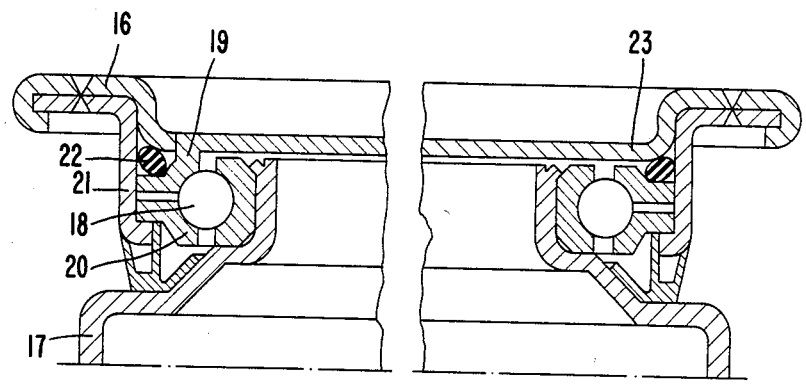

FIGS. 3a and 3b show two different embodiments of a castor wheel bearing arrangement. The device comprises a plate 16 adapted for connection to e.g. a piece of furniture or a transport carriage, and a fork 17 which straddles a wheel, not shown. The fork is freely rotatable in relation to the plate 16 by being suspended by a ball bearing 18. The outer ring of the ball bearing consists of two parts 19, 20, one 20 of which being fixed in a housing 21 provided in the plate 16 and the other 21 of which being axially displaceable in the housing. An elastic ring 22 is squeezed between a flange on the outer ring part 19 and a confronting surface on the plate 16, whereby the ring 22 presses the ring part 19 axially against the balls in the bearing. According to FIG. 3a, the ring part 19 is shaped as a cup arranged in a recess in the plate 16, whereby the ring part can be displaced in the recess. The elastic ring 22 is enclosed in a closed space so that it can be deformed and completely fill the space and give a rigid bearing arrangement. If the device is not subjected to heavy loads, the ring part 19 can be shaped as in FIG. 3b, whereby a slot is formed between the ring part and a bottom part 23 of the plate 16. If the squeezing force on the elastic ring is moderate, there will be no problem of the ring 22 creeping out through the slot.

Figures 4, 5:
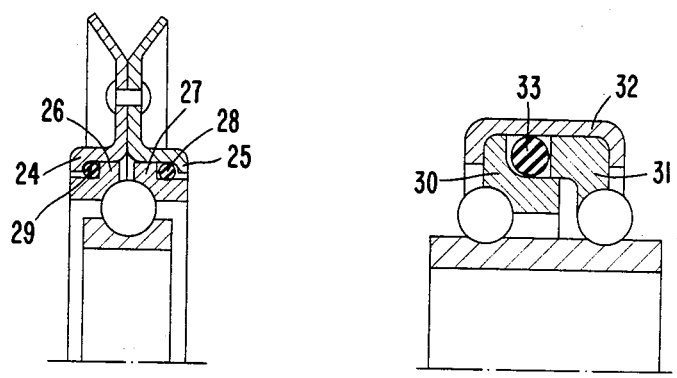

FIG. 4 shows an embodiment of the invention in the shape of a belt pulley with a bearing. A cylindrical hub in the pulley encloses the bearing and is provided with inwardly directed flanges 24, 25, which together with outwardly directed flanges 26, 27 on discrete parts of an outer ring delimit two spaces for rubber rings 28, 29. The outer ring parts are displaceable axially in the hub and are urged against the rolling element of the bearing by the rubber rings.

FIG. 5 shows a two-row angular contact ball bearing with an outer ring in two parts 30, 31, one of which being telescopically displaceable in the other and in a surrounding sleeve 32. An elastic ring 33 is arranged in a closed space delimited by the sleeve and the outer ring parts and urge the latter against a row of rolling elements each.

Other embodiments of the invention than those described above are possible within the scope of the claim. For example, the outer sleeve 6 and the outer ring 4 (FIG. 1) can be made in one piece. The rings 4 and 5 as well as 12 and 15, respectively, are preferably identical, but may also have different shapes. Seals can be arranged between portions of the outer and the inner ring which face each other. The inner raceways may possibly be arranged on separate rings, which are mutually displaceable and co-operate with an elastic ring, whereby the outer raceways may be provided on a single element. The inner or outer raceways can be arranged directly in the associated element, such as a journal or a hub, instead of in separate bearing rings. The bearing may comprise e.g. tapered rollers instead of balls as rolling element.

What is claimed is:

1. In an angular contact bearing comprising at least one row of rolling elements disposed between inner and outer rings, at least one of said rings being divided into two ring elements, the inner and outer rings having opposing contact angles, an elastically deformable member mounted in an annular space having surfaces movable relative to one another in a manner providing a decrease in the axial bearing play when the distance between the surfaces increases, said elastically deformable member being deformed by pressure against the surfaces when no bearing play exists, said elastically deformable member being substantially incompressible and completely filling said annular space when the parts of the bearing are completely assembled and mounted.

2. In a bearing assembly comprising at least one row of rolling elements disposed between inner and outer ring members, at least one of said rings consisting of a pair of ring elements, the inner and outer ring members having opposing contact angles, means defining an annular enclosed chamber defined by surfaces, two of said surfaces being opposed and being movable relative to one another in a manner providing a decrease in the axial bearing play when the distance between said opposing surfaces increases, one of said opposing surfaces being defined by a surface of one of said ring elements, an elastically deformable member mounted in said annular space which is substantially incompressible and completely fills said annular space for a given predetermined preload when the parts of the bearing are completely assembled to thereby maintain a substantially uniform preload of the bearing and provide a relatively stiff or rigid assembly capable of withstanding relatively heavy loads without appreciable deformation of said elastic resilient member.

3. A device as claimed in claim 2 wherein the bearing assembly is an angular contact bearing and wherein said inner ring has raceways adjacent opposite ends thereof for two rows of rolling elements, a pair of outer rings for the rolling elements and a sleeve circumscribing the outer rings being of a smaller axial length than the space between the outer ends of the outer rings to define an annular space for the elastically deformable member.

4. A device as claimed in claim 2 wherein the bearing assembly is an angular contact bearing and wherein said inner ring has raceways adjacent to opposite ends thereof for two rows of rolling elements, a pair of outer rings for the rolling elements and a roller circumscribing the outer rings having a circumferentially extending recess therein overlying one of the outer rings and defining the space for the elastically deformable member, ring member engageable in said recess and of a volume together with said elastically deformable member to completely fill said recess.

* * * * *